(12) United States Patent
Metka et al.

(10) Patent No.: US 11,338,863 B1
(45) Date of Patent: May 24, 2022

(54) RETRACTABLE GUTTER SYSTEM FOR A VEHICLE

(71) Applicant: Honda Motor Co., Ltd., Tokyo (JP)

(72) Inventors: Matthew L. Metka, Plain City, OH (US); Pirooz Moradnia, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/115,099

(22) Filed: Dec. 8, 2020

(51) Int. Cl.
   *B62D 25/24* (2006.01)
   *B62D 25/04* (2006.01)

(52) U.S. Cl.
   CPC ............. *B62D 25/24* (2013.01); *B62D 25/04* (2013.01)

(58) Field of Classification Search
   CPC ........ B62D 25/04; B62D 25/07; B62D 25/24; B60R 13/07; B60R 13/06
   USPC .......................... 296/95.1, 213, 1.08, 193.06
   See application file for complete search history.

(56) References Cited

U.S. PATENT DOCUMENTS

| | | | |
|---|---|---|---|
| 5,118,157 A | 6/1992 | Tamura | |
| 6,899,376 B1 | 5/2005 | Sullivan | |
| 7,367,609 B2 | 5/2008 | Grudzinski et al. | |
| 8,146,979 B2 | 4/2012 | Renke et al. | |
| 8,454,083 B2 | 6/2013 | Dimitriou et al. | |
| 10,173,510 B2 | 1/2019 | Vojtisek et al. | |
| 10,449,912 B2 | 10/2019 | Okabe et al. | |
| 10,589,610 B2 | 3/2020 | Takashi | |
| 10,597,088 B2 | 3/2020 | Gulker et al. | |
| 2010/0320796 A1 | 12/2010 | Hoefer et al. | |
| 2016/0129771 A1 | 5/2016 | Nakai et al. | |

FOREIGN PATENT DOCUMENTS

| | | | |
|---|---|---|---|
| DE | 3119358 | | 12/1982 |
| DE | 3936372 | | 5/1991 |
| DE | 4307303 | | 9/1994 |
| DE | 102004042703 | * | 3/2003 |
| DE | 102004042703 | | 3/2006 |
| DE | 19907390 | | 8/2008 |
| DE | 102009009469 | | 8/2010 |

(Continued)

OTHER PUBLICATIONS

EZE-RV Gutter System-10' Package, Ultra White|Camping World, date printed May 4, 2020, https://www.campingworld.com/eze-rv-gutter-system10%27-package--ultra-white-16962.html.

(Continued)

*Primary Examiner* — Dennis H Pedder
(74) *Attorney, Agent, or Firm* — Rankin, Hill & Clark LLP (57) ABSTRACT

A vehicle includes a body including an A-pillar, and a windshield having an exterior surface and a lateral edge secured to the A-pillar. The A-pillar has a first part and a second part. The first part is positioned on the second part along the lateral edge of the windshield. The first part is movable relative to the second part from a stowed position wherein an outer surface of the first part is flush with an outer surface of the second part, and a deployed position wherein the outer surface of the first part is positioned entirely outward from the outer surface of the second part. The first part includes a movable member that in the deployed position of the first part is shaped to collect water flowing across the exterior surface of the windshield.

16 Claims, 6 Drawing Sheets

(56) References Cited

FOREIGN PATENT DOCUMENTS

| | | | |
|---|---|---|---|
| DE | 102011087739 | * | 6/2013 |
| DE | 102012221993 | | 6/2014 |
| DE | 102012221994 | | 6/2014 |
| DE | 102012221995 | | 6/2014 |
| DE | 102014017103 | | 5/2016 |
| EP | 0952018 | | 10/1999 |
| EP | 2353903 | | 8/2011 |
| EP | 2429862 | | 3/2012 |
| JP | H11334358 | | 12/1999 |
| JP | 2010058656 | | 3/2010 |
| KR | 19980010798 | | 5/1998 |
| KR | 200145667 | | 6/1999 |
| KR | 10-0291061 | | 6/2001 |
| KR | 100494729 | | 6/2005 |
| KR | 101324324 | | 11/2013 |
| KR | 20140029802 | | 3/2014 |

OTHER PUBLICATIONS

National Guard, Dark Bronze Rain Drip Guard, Flange Height ⅝", Projection 2-½", Length 76", date printed May 4, 2020, https://www.grainger.com/product/NATIONAL-GUARD-Dark-Bronze-Rain-Drip-Guard-45AA36.

* cited by examiner

RETRACTABLE GUTTER SYSTEM FOR A VEHICLE

BACKGROUND

For improved performance and efficiency, vehicles are incentivized to adopt aerodynamic shapes featuring a smooth exterior surface, including the exterior surface between a windshield and side windows. For improved driver visibility through side windows in raining weather conditions, vehicles are also incentivized to adopt elements such as gutter channels interposed between the windshield and the side windows along the exterior surface. Gutter channels interposed between the windshield and a side window are configured for preventing rain from sliding across the exterior surface of the vehicle, from the windshield to the side window according to a headwind of the vehicle when the vehicle is being driven.

Known gutter channels are formed from static incongruities in paneling along the exterior surface of the vehicle to catch rain water between the windshield and a window, and guide the caught rain water over a top of the vehicle using the headwind of the vehicle. While known gutter channels may successfully prevent rain on the front of the vehicle from sliding to the side windows in raining weather conditions, the static incongruities forming the gutter channels disrupt the otherwise smooth exterior surface and reduce an aerodynamic aspect thereof, even when the vehicle is driven outside raining weather conditions.

BRIEF DESCRIPTION

According to one aspect, a vehicle comprises a body including an A-pillar, and a windshield having an exterior surface and a lateral edge secured to the A-pillar. The A-pillar has a first part and a second part. The first part is positioned on the second part along the lateral edge of the windshield. The first part is movable relative to the second part from a stowed position wherein an outer surface of the first part is flush with an outer surface of the second part, and a deployed position wherein the outer surface of the first part is positioned entirely outward from the outer surface of the second part. The first part includes a movable member that in the deployed position of the first part is shaped to collect water flowing across the exterior surface of the windshield.

According to another aspect, a vehicle comprises a body including an A-pillar having an outer forming part, a windshield having an exterior surface and a lateral edge secured to the A-pillar, and a retractable gutter system housed in the A-pillar. The gutter system includes a cover, a movable member connected to the cover, and a drive mechanism operably connected to the cover. The drive mechanism is configured to move the cover from a stowed position to a deployed position, where in the stowed position an outer surface of the cover at least partially forms an outer surface of the outer forming part, and where in the deployed position the movable member is shaped to channel water flowing across the exterior surface of the windshield down the outer forming part of the A-pillar.

According to another aspect, a method of operating a retractable gutter system provided as part of an outer forming part of an A-pillar of a vehicle body is provided. The method comprises actuating a drive mechanism of the gutter system in response to one of a user command and a sensor input indicating water on an exterior surface of a windshield; moving a cover of the gutter system operably connected to the drive mechanism from a stowed position where an outer surface of the cover at least partially forms an outer surface of the outer forming part to a deployed position where the cover is positioned entirely outward from the outer surface of the outer forming part to define a gap between the cover and the outer forming part; and covering the gap with a movable member of the gutter system, the movable member shaped to collect water flowing across the exterior surface of the windshield.

DETAILED DESCRIPTION

Figure 1:
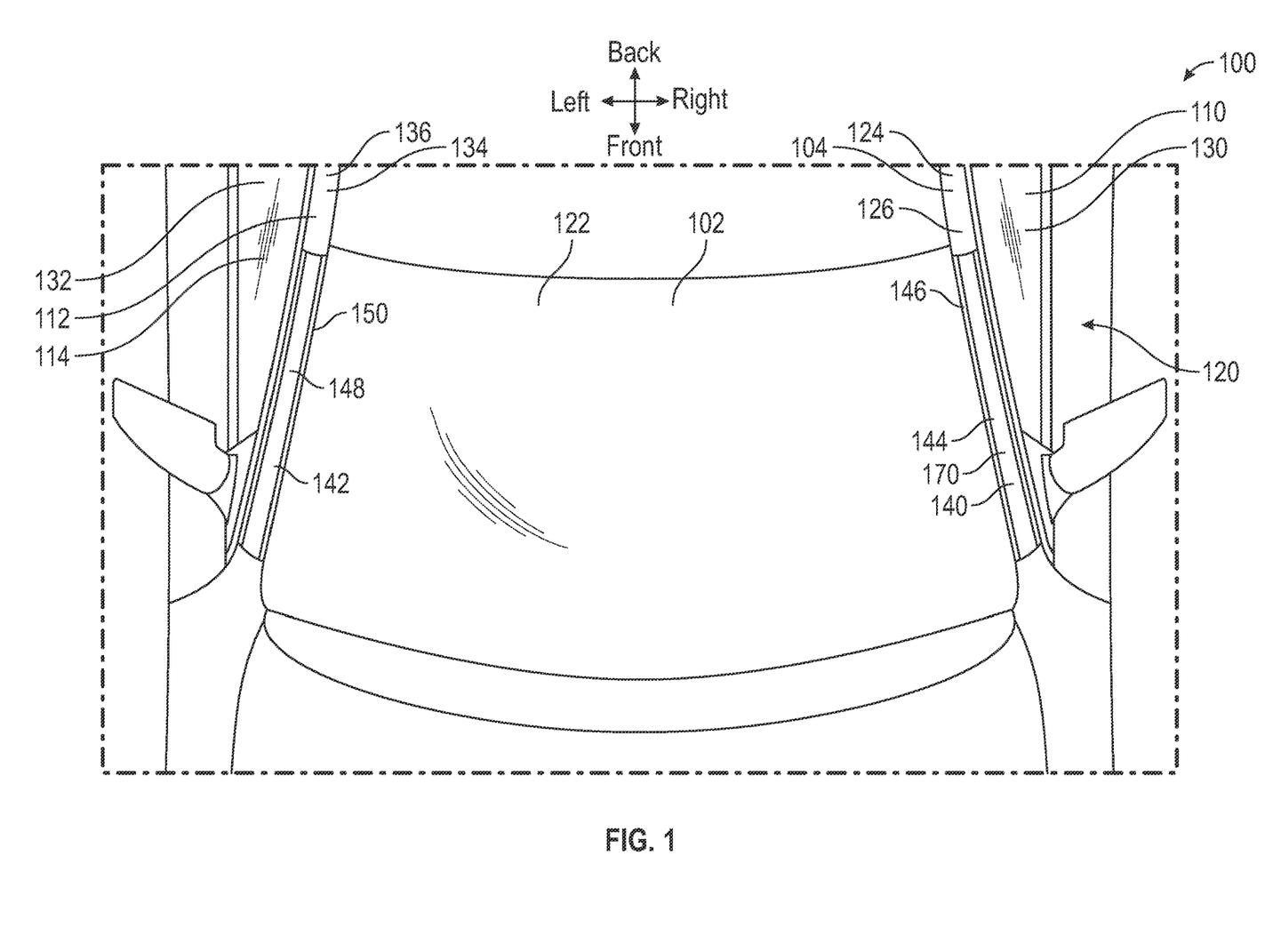
FIG. 1 is a partial top schematic view of a vehicle including a gutter system according to the present disclosure.
Figure 2:
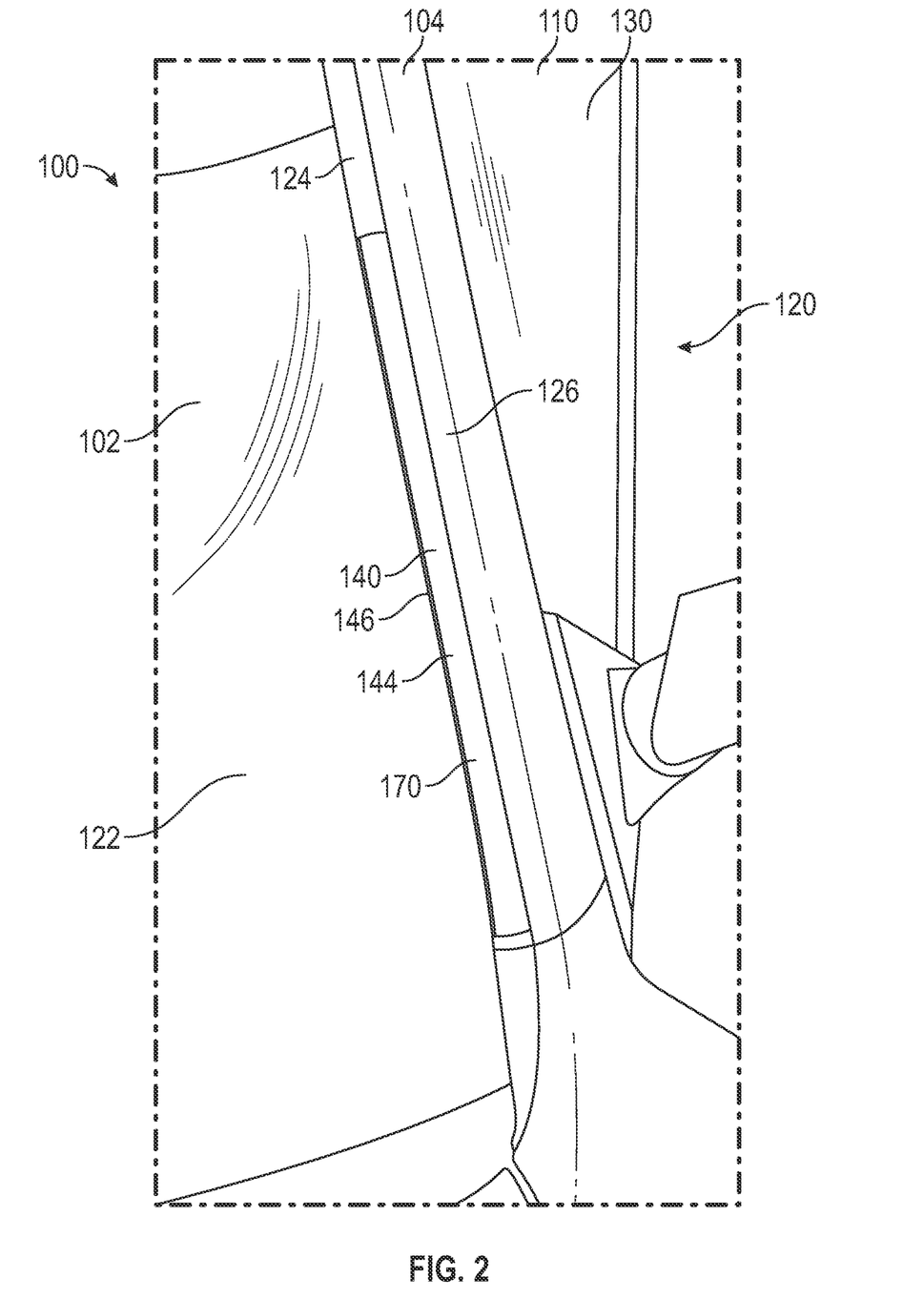
FIG. 2 is an enlarged partial view of FIG. 2.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1 and 2 depict a vehicle 100 including a front windshield 102, a first (i.e., right) A-pillar 104, a first (i.e., driver's) side window 110, a second (i.e., left) A-pillar 112, and a second (i.e., passenger's) side window 114. As is known in the art, the first and second A-pillars define part of a vehicle body. The first A-pillar 104 is interposed between and separates the windshield 102 from the first side window 110 in a lateral (i.e., width) direction of the vehicle 100, specifically in a left-right direction of the vehicle 100, such that an exterior surface 120 of the vehicle 100 includes an exterior surface 122 of the windshield 102, an outer or exterior surface 124 of the first A-pillar 104 (defined by an outer forming part 126), and an exterior surface 130 of the first side window 110 along the lateral direction of the vehicle 100. As depicted, the exterior surface 124 of the first A-pillar 104 is substantially flush with the exterior surface 122 of the windshield 102 and the exterior surface 130 of the first side window 110 such that an aerodynamic curve of the exterior surface 120 of the vehicle 100 is substantially continuous from the exterior surface 122 of the windshield 102 to the exterior surface 130 of the first side window 110 across the exterior surface 124 of the first A-pillar.

The second A-pillar 112 features a construction similar to the first A-pillar 104, where the second A-pillar 112 is interposed between and separates the windshield 102 from the second side window 114 in the lateral direction of the vehicle 100, specifically a right-left direction of the vehicle 100, such that the exterior surface 120 of the vehicle 100 includes an outer or exterior surface 132 of the second side window 114, an exterior surface 134 of the second A-pillar 112 (defined by an outer forming part 136), and the exterior surface 122 of the windshield 102 along the lateral direction of the vehicle 100. As depicted, the exterior surface 134 of the second A-pillar 112 is substantially flush with the exterior surface 122 of the windshield 102 and the exterior surface 132 of the second side window 114 such that the aerodynamic curve of the exterior surface 120 of the vehicle 100 is substantially continuous from the exterior surface 122 of the windshield 102 to the exterior surface 130 of the first side window 110 across the exterior surface 134 of the second A-pillar 112.

By way of example, each outer forming part 126 and 136 is described herein as an outer trim member of the respective first A-pillar 104 and second A-pillar 112. However, it should be appreciated that each outer forming part 126 and 136 can be an outer body panel of the respective first A-pillar 104 and second A-pillar 112. Further, each outer forming part 126 and 136 can have a chrome exterior surface or can have an exterior surface color matched to that of the vehicle body.

The windshield 102 is interposed between and separates the first A-pillar 104 and the second A-pillar 112 in the lateral, right-left direction of the vehicle 100, and the exterior surface 122 of the windshield 102 is continuous between the first A-pillar 104 and the second A-pillar 112 in the lateral direction of the vehicle 100. As such, the aerodynamic curve of the exterior surface 120 of the vehicle 100 is substantially continuous from the exterior surface 124 of the first A-pillar 104 to the exterior surface 134 of the second A-pillar 112 across the windshield 102 in the lateral direction of the vehicle 100, and is further substantially continuous from the exterior surface 130 of the first side window 110 to the exterior surface 132 of the second side window 114 across the exterior surface 124 of the first A-pillar 104, the exterior surface 122 of the windshield 102, and the exterior surface 134 of the second A-pillar 112 in the lateral direction of the vehicle 100.

A first retractable gutter system 140 is disposed or housed in the first A-pillar 104 and at least partially forms the exterior surface 124 of the outer trim member 126 of the first A-pillar 104. A second retractable gutter system 142 has a construction similar to the first gutter system 140 and has an orientation opposite from the first gutter system 140 with respect to the lateral direction of the vehicle 100. To this end, the second gutter system 142 is disposed or housed in the second A-pillar 112 and at least partially forms the exterior surface 134 the outer trim member 136 of the second A-pillar 112. According to the present disclosure, the first and second gutter systems 140, 142 are configured to channel water down the exterior surface 122 of the windshield 102, and down the outer trim member 126, 136, thereby preventing water from sliding across the exterior surface 120 of the vehicle 100, from the windshield 102 to the first and second side windows 110, 114 according to a headwind of the vehicle when the vehicle is being driven.

As depicted in FIG. 1, the first gutter system 140 includes a cover 144 that at least partially defines the outer trim member 126 at a location between a first lateral edge 146 of the windshield 102 and the first side window 110 in the lateral direction of the vehicle 100. In this manner, the exterior surface 120 of the vehicle 100 is at least partially formed by the windshield 102, the cover 144, the outer trim member 126 and the first side window 110 in the lateral direction of the vehicle 100. Similarly, the second gutter system 140 includes a cover 148 that at least partially defines the outer trim member 136 at a location between a second opposite lateral edge 150 of the windshield 102 and the second side window 114 in the lateral direction of the vehicle 100. Therefore, in this manner, the exterior surface 120 of the vehicle 100 is at least partially formed by the windshield 102, the cover 148, the outer trim member 136 and the second side window 114 in the lateral direction of the vehicle 100.

Further depicted in FIG. 1, the cover 144 extends along a majority of a length of the first lateral edge 146 of the windshield, and the cover 148 extends along a majority of a length of the second lateral edge 150 of the windshield. It should be appreciated that by having the covers 144, 148 extended in this manner substantially all of the water on the exterior surface 122 of the windshield 102 can be channeled away for the first and second A-pillars 104, 112. According to one aspect, each of the first cover 144 and the second cover 148 can be a laterally split cover having at least two interconnected sections to accommodate for differing curvatures of the windshield 102 and the outer trim member 126, 136.

Figure 3:
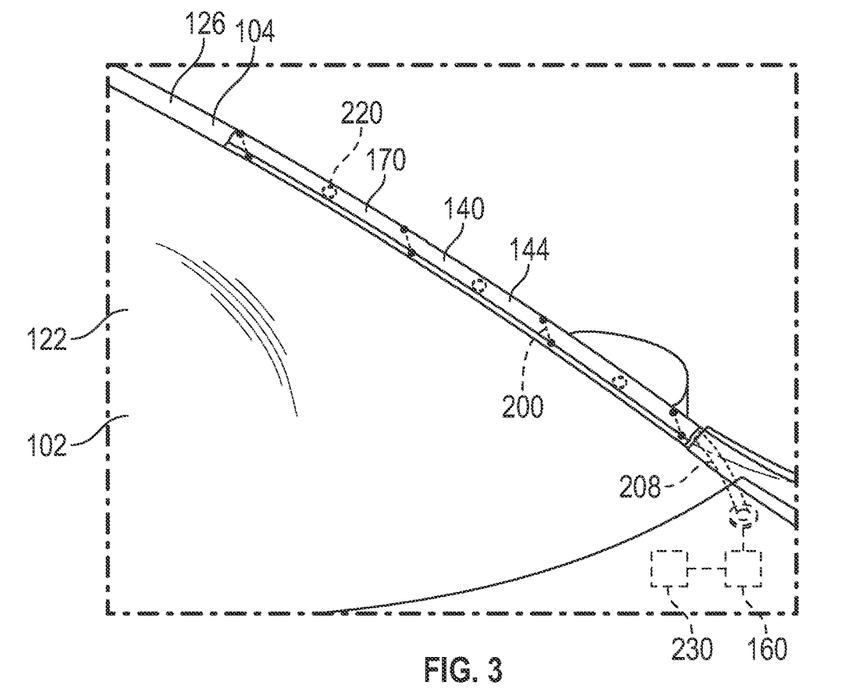
FIG. 3 is an enlarged partial view of FIG. 2 depicting the gutter system according to one aspect of the present disclosure, the gutter system in a stowed position.
Figure 4:
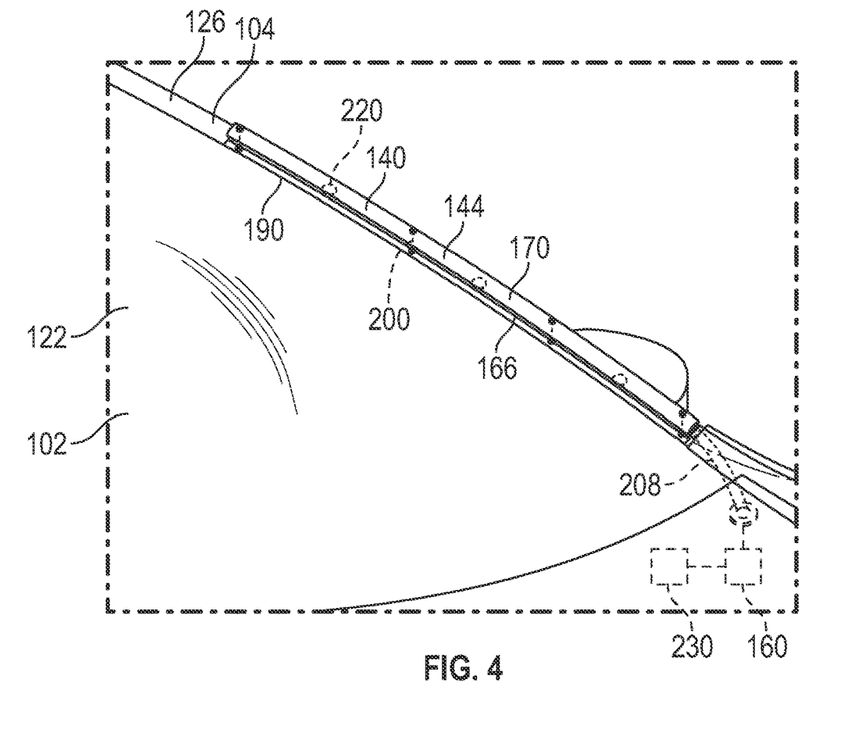
FIG. 4 is an enlarged partial view depicting the gutter system of FIG. 3 in a deployed position.

Unless otherwise stated, the following description made with reference to the first gutter system 140 is similarly applicable to the second gutter system 142. The first gutter system includes the cover 144, a drive mechanism 160 (schematically shown in FIGS. 3 and 4) operably connected to the cover, and a movable member 166. The drive mechanism 160 is configured to move the cover 144 between a stowed position (FIGS. 3 and 5) and a deployed position (FIGS. 4 and 6). The drive mechanism 160 can include an electric motor and a speed reduction mechanism; although, alternative drive components are contemplated. In the stowed position, an outer surface or exterior surface 170 of the cover 144 is flush with the exterior surface 124 of the outer trim member 126 of the first A-pillar 104. In the deployed position, the outer or exterior surface 170 of the cover 144 is positioned entirely outward from the exterior surface 124 of the outer trim member 126 to define a gap 174 between the outer trim member 126 and the cover 144. The gap 174 is covered by the movable member 166, which in the deployed position is configured and shaped to collect water flowing across the exterior surface 122 of the windshield 102 and channel the water down the A-pillar 104.

Figure 5:
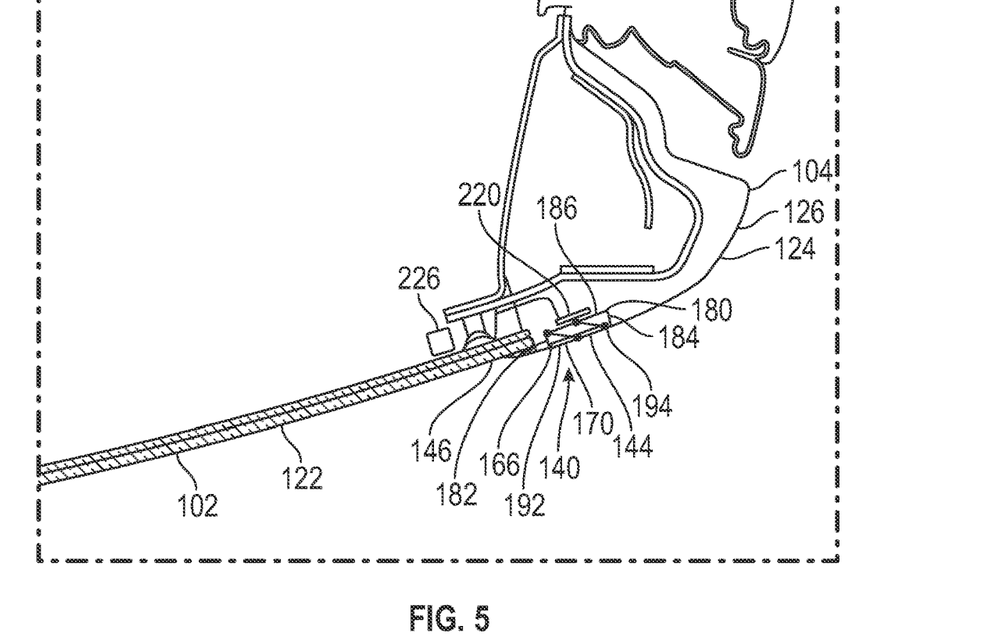
FIG. 5 is a partial cross-sectional view along a longitudinal, front-back direction of the vehicle of FIG. 3.
Figure 6:
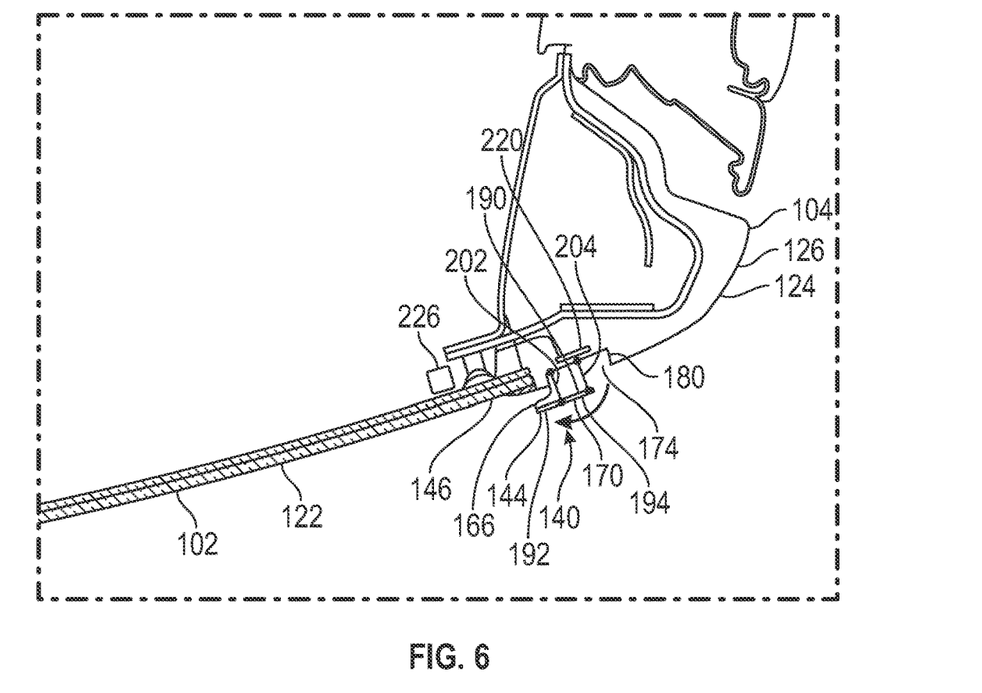
FIG. 6 is a partial cross-sectional view along a longitudinal, front-back direction of the vehicle of FIG. 4.

With reference to FIGS. 5 and 6, to accommodate the cover 144 in the stowed position, the outer trim member 126 of the first A-pillar 104 includes a channel 180 elongated in both a front-back direction and a bottom-up (i.e., height) direction of the vehicle 100. The channel 180 is defined by sidewalls 182, 184 and a base wall 186 interconnecting the sidewalls 182, 184, and the channel 180 is sized to receive the cover 144 in the stowed position. In the stowed position of the cover 144, the movable member 166 forms a seal between the cover 144 and the sidewall 182 to prevent water and dirt from entering into the channel 180.

In FIGS. 5 and 6, the cover 144 of the first gutter system 140 includes the outer surface 170 (i.e., a top surface), a bottom surface 190, an inboard lateral edge portion 192 and an outboard lateral edge portion 194. In the lateral direction of the vehicle 100, the inboard lateral edge portion 192 is located closer to the first lateral edge 146 of the windshield 102 than the outboard lateral edge portion 194. Because the outer surface 170 conforms to the aerodynamic shape of the outer surface 124 of the outer trim member 126 in the stowed position of the cover 144, in the deployed position of the cover 144 the outer surface 170 can redirect headwind away from the first A-pillar 104 and the first side window 110. To provide for the movement of the cover 144 between the stowed position and the deployed position, at least one connector or linkage 200 pivotally connects the cover 144 to the outer trim member 126, specifically the bottom surface 190 of the cover 144 to the base wall 186 of the channel 180. In the depicted aspect, the at least linkage 200 are inboard linkages 202 and outboard linkages 204, which together with the cover 144 and the base wall 186 can form a four-bar linkage configured to deploy the cover from within the channel 180. The inboard linkages 202 can be secured to the bottom surface 190 outboard of the inboard lateral edge portion 192 and the outboard linkages 204 can be secured to the bottom surface at the outboard lateral edge portion 194. The drive mechanism 160 is operably engaged to the at least one linkage 200 via, for example, a drive linkage 208 (schematically depicted in FIGS. 3 and 4), and movement of the at least one linkage 200 via the drive mechanism 160 pivots the cover 144 outwardly toward the first lateral edge 146 of the windshield 102. In FIG. 6, the at least one linkage 200 can be configured to locate the inboard lateral edge portion 192 of the cover 144 in the deployed position at least partially over that part of the outer trim member 126 separating the first gutter system 140 and the windshield (which, for example, can be a separate, static strip of the first A-pillar 104). However, it should be appreciated that that the at least one linkage 200 can be configured to locate the inboard lateral edge portion 192 of the cover 144 in the deployed position at least partially over the first lateral edge 146 of the windshield 102.

As indicated previously, in the deployed position of the cover, the movable member 166 is configured and shaped to direct water down the exterior surface 122 of the windshield 102 and the outer trim member 126. In the present embodiment, the movable member is a seal or membrane connected between the cover 144 and the outer trim member 126, specifically between the inboard lateral edge portion 192 of the cover 144 and the sidewall 182 of the channel 180, thereby preventing water from flowing under the cover 144. With the connection to the inboard lateral edge portion 192, in the deployed condition of the cover 144 the seal or membrane is also extended at least partially over that part of the outer trim member 126 separating the first gutter system 140 and the windshield 102. This, in turn, allows the seal or membrane to form a water gutter that is elongated along a length of the cover 144.

The first gutter system 140 further includes a retention member 220 configured to maintain the cover 144 in the stowed position prior to actuation of the drive mechanism 160. As shown in FIGS. 3-6, the retention member 220 can be at least one magnet connected to the outer trim member 126. The at least magnet can be secured beneath the base wall 186 of the channel 180 so that the at least one magnet faces the bottom surface 190 of the cover 144 in the stowed position. According to one aspect, the at least one magnet can be at least one electromagnet which is energized when the cover 144 is in the stowed position. To allow for the use of the at least one magnet, the cover 144 can be formed of a plastic material (similar to the material of the outer trim member 126) impregnated with a metallic material, or can have a metallic core that is overmolded by a plastic material. Further depicted, the at least one magnet is three magnets spaced along the length of the cover 144; however, more or less than three magnets can be used to maintain the cover 144 in the stowed position. It should be appreciated that alternative configurations for the retention member 220 are contemplated. For example, the retention member 220 can be in the form of a resilient finger provide on the bottom surface 190 of the cover 144 that releasably engages a catch located in the channel 180. The retention member 220 can also be in the form of a biasing member (e.g., a compression spring) that interconnects the cover bottom surface 190 and the base wall 186 of the channel 180.

Rain or moisture sensors (only sensor 226 associated with the first gutter system 140 is schematically depicted in FIGS. 5 and 6) can be provided on the vehicle 100 (e.g., on the windshield 102 adjacent the first A-pillar 104) for a number of purposes, including automatically turning on windshield wipers (not shown) when an amount of water detected on the exterior surface 122 of the windshield 102 exceeds a nominal amount, and adjusting the speed of the windshield wipers based on the amount of water that is detected. The operation of the first and second gutter systems 140, 142 can be controlled by controllers (only controller 230 associated with the first gutter system 140 is schematically depicted in FIGS. 3 and 4) in signal communication with the sensors. By way of example, regarding the first gutter system 140, the controller 230 (e.g., a computer processing unit) can be configured to actuate the drive mechanism 160 coupled to the cover 144 in response to an input from a user (e.g., by the driver actuating a switch or lever in the vehicle) and/or from an input of the sensor 226. However, it should be appreciated that the windshield wipers (not shown) can be actuated independent of the first and second gutter systems 140, 142. For example, deployment of the covers 144, 148 may not be necessary when a driver is simply removing excess water from the windshield 102 (e.g., after a car wash) or when the windshield 102 is being cleaned while driving as is known in the art. Therefore, where there is not an input from a user, actuation of the drive mechanisms of the first and second gutter systems 140, 142 by the controllers can be generally limited to a vehicle driving condition where an amount of water detected by the sensors exceeds a nominal amount. It should be appreciated that the controllers may be part of a main electronic control unit for various electronically implemented vehicle systems. It should further be appreciated that regarding the retention member 220 in the form of at least one electromagnet, the controller can be configured to energize the at least one electromagnet in the stowed condition of the cover 144 and de-energize the at least one electromagnet in response to an input from a user and/or from an input of the sensor 226.

Figure 7:
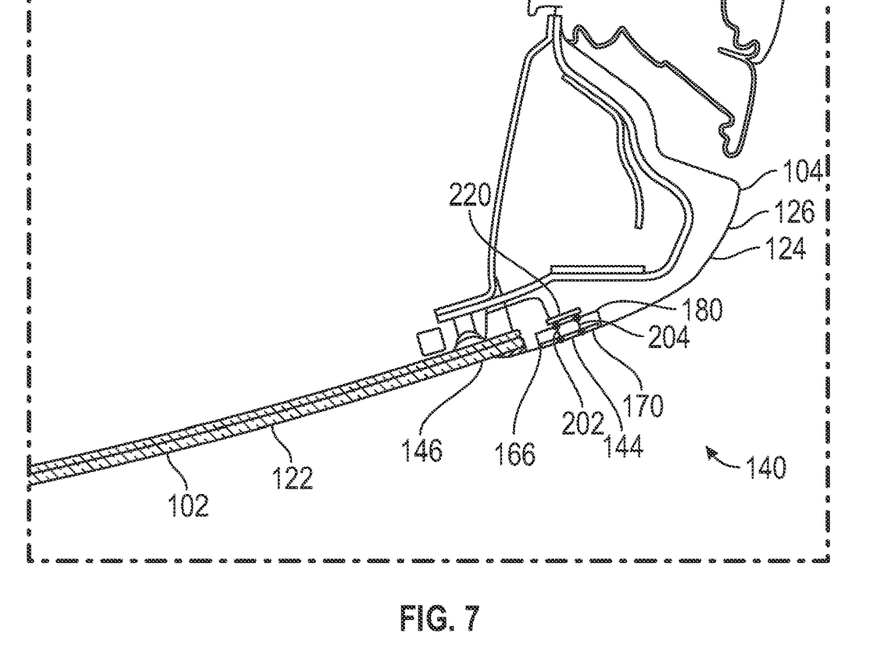
FIG. 7 is a partial cross-sectional view along a longitudinal, front-back direction of the vehicle of FIG. 2 depicting the gutter system according to another aspect of the present disclosure, the gutter system in a stowed position.
Figure 8:
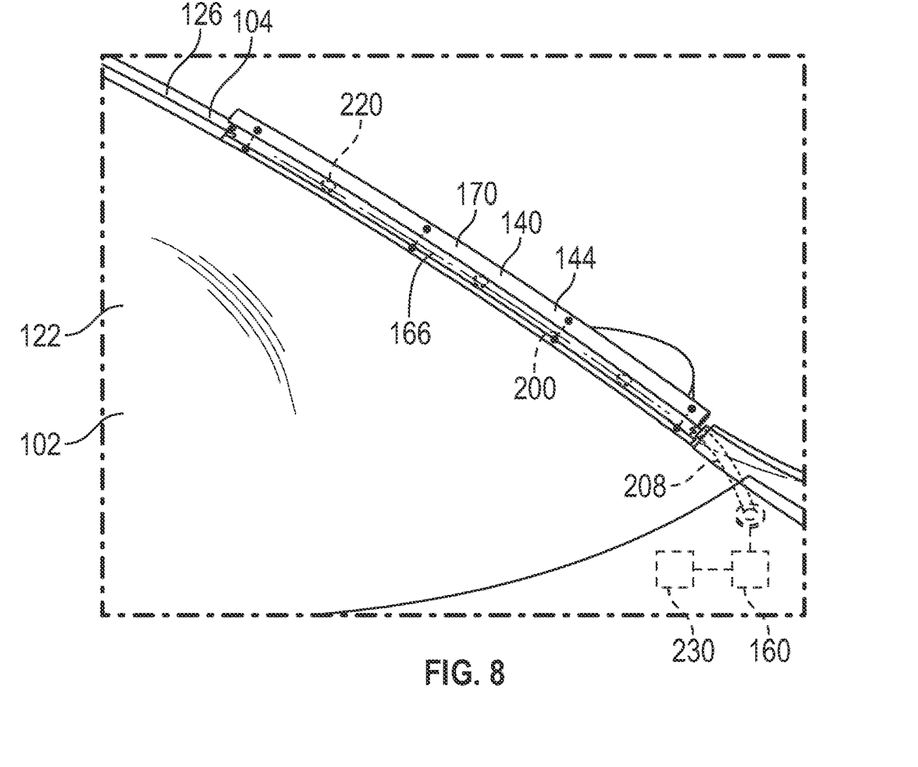
FIG. 8 is an enlarged partial view depicting the gutter system of FIG. 7 in a deployed position.
Figure 9:
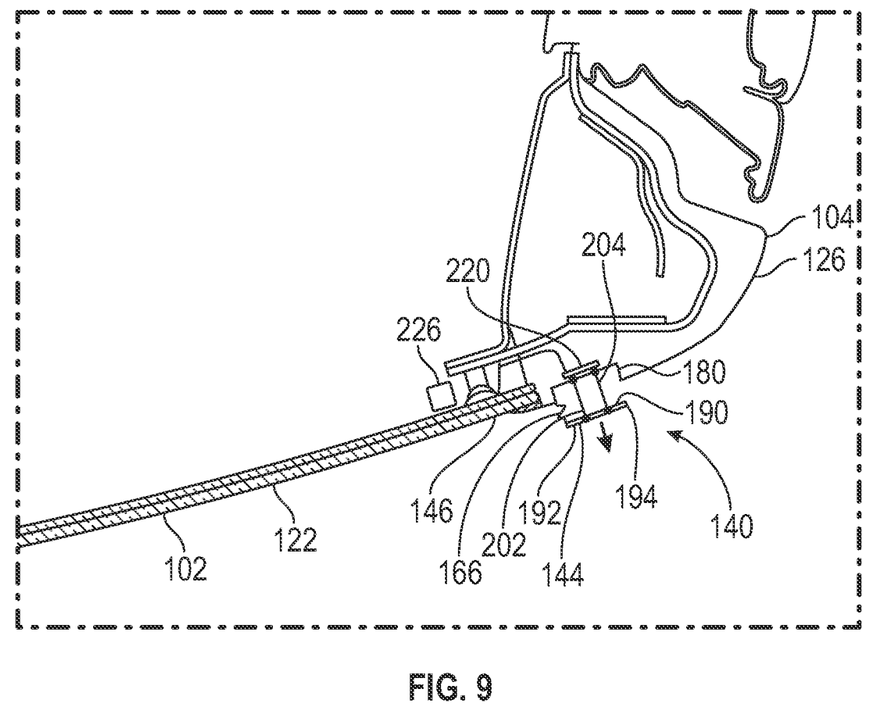
FIG. 9 is a partial cross-sectional view along a longitudinal, front-back direction of the vehicle of FIG. 7.

FIGS. 7-9 illustrate another aspect of the first and second gutter systems 140, 142, which differs in the manner by which the covers 144, 148 move from the stowed positions to the deployed positions. Again, unless otherwise stated, the following description made with reference to the first gutter system 140 is similarly applicable to the second gutter system 142.

As indicated above, to provide for the movement of the cover 144 between the stowed position and the deployed position, at least one connector or linkage 200 pivotally connects the cover 144 to the outer trim member 126. In the depicted aspect, the at least linkage 200 are inboard linkages 202 and outboard linkages 204. The inboard linkages 202 can be secured to the bottom surface 190 of the cover 144 outboard of the inboard lateral edge portion 192 and the outboard linkages 204 can be secured to the bottom surface inboard of the outboard lateral edge portion 194. The drive mechanism 160 is operably engaged to the at least one linkage 200 via, for example, the drive linkage 208 (schematically depicted in FIG. 8), and movement of the at least one linkage 200 via the drive mechanism 160 moves the cover 144 directly outwardly from the outer trim member 126 with the cover 144 maintaining lateral alignment with the channel 180. The movable member 166 connected between the cover 144 and the outer trim member 126 is configured and shaped to direct water down the exterior surface 122 of the windshield 102 and the outer trim member 126.

Therefore, according to the present disclosure, each of the first A-pillar 104 and the second A-pillar 112 has a first part (i.e., the covers 144, 148) and a second part (i.e., the outer trim members 126, 136). The first part is positioned on the second part along the lateral edge 146, 150 of the windshield 102. The first part is movable relative to the second part from a stowed position wherein an outer surface of the first part is flush with an outer surface of the second part, and a deployed position wherein the outer surface of the first part is positioned entirely outward from the outer surface of the second part. The first part includes a movable member 166 that in the deployed position of the first part is configured to direct water down the exterior surface 122 of the windshield 102.

As is evident from the foregoing, a method of operating a retractable gutter system 140, 142 provided as part of an outer trim member 126, 136 of an A-pillar 104, 112 of a vehicle body is provided. The method comprises actuating a drive mechanism of the gutter system in response to one of a user command and a sensor input indicating water on an exterior surface 122 of a windshield 102; moving a cover 144, 148 of the gutter system 140, 142 operably connected to the drive mechanism from a stowed position where an outer surface of the cover at least partially forms an outer surface of the outer trim member 126, 136 to a deployed position where the cover is positioned entirely outward from the outer surface of the outer trim member to define a gap between the cover and the outer trim member; and covering the gap with a movable member 166 of the gutter system 140, 142, the movable member shaped to collect water flowing across the exterior surface of the windshield 102.

The exemplary method further includes positioning the cover 144, 148 in the stowed position in a channel formed in the outer trim member 126, 136, the channel elongated in both a front-back direction and bottom-up direction of the vehicle. The method further includes maintaining the cover 144, 18 within the channel with a retention member 220 of the gutter system prior to actuation of the drive mechanism.

It will be appreciated that various embodiments of the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle comprising:
a body including an A-pillar; and
a windshield having an exterior surface and a lateral edge secured to the A-pillar,
wherein the A-pillar has a first part and a second part, the first part positioned on the second part along the lateral edge of the windshield, the first part is movable relative to the second part from a stowed position wherein an outer surface of the first part is flush with an outer surface of the second part, and a deployed position wherein the outer surface of the first part is positioned entirely outward from the outer surface of the second part, and the first part includes a movable member that in the deployed position of the first part is shaped to collect water flowing across the exterior surface of the windshield,
wherein the first part is a cover of a retractable gutter system housed in the A-pillar, and the second part is an outer forming part of the A-pillar, the outer forming part includes an elongated channel sized to receive the cover in the stowed position, the channel is defined by inner walls of the outer forming part including sidewalls intersecting an outer surface of the outer forming part and a base wall interconnecting the sidewalls,
wherein the movable member is a seal connected between a lateral edge portion of the cover and one of the inner walls of the outer forming part defining the channel.

2. The vehicle of claim 1, wherein the retractable gutter system includes a drive mechanism operably connected to the cover, the drive mechanism configured to move the cover between the stowed position and the deployed position.

3. The vehicle of claim 2, wherein at least one linkage pivotally connects the cover to the outer forming part, the drive mechanism is operably engaged to the at least one linkage, and movement of the at least one linkage via the drive mechanism pivots the cover outwardly toward the lateral edge of the windshield.

4. The vehicle of claim 2, wherein the retractable gutter system includes a retention member configured to maintain the cover in the stowed position prior to actuation of the drive mechanism.

5. The vehicle of claim 4, wherein the retention member is at least one magnet connected to the outer forming part, the at least one magnet facing a bottom surface of the cover in the stowed position.

6. The vehicle of claim 2, further comprising a controller configured to actuate the drive mechanism in response to input from at least one of a user and a sensor configured to detect water on the exterior surface of the associated windshield.

7. The vehicle of claim 2, wherein the outer forming part includes an elongated channel, the channel sized to receive the cover in the stowed position, and
at least one linkage pivotally connects the cover to the outer forming part, the drive mechanism is operably engaged to the at least one linkage, and movement of the at least one linkage via the drive mechanism moves the cover directly outwardly from the outer forming part with the cover maintaining alignment with the channel.

8. The vehicle of claim 1, where in the deployed condition of the cover the lateral edge portion of the cover extends at least partially over the outer forming part.

9. The vehicle of claim 1, wherein an exterior surface of the vehicle is at least partially formed by the outer surface of the cover in the stowed position.

10. A vehicle comprising:
a body including an A-pillar having an outer forming part;
a windshield having an exterior surface and a lateral edge secured to the A-pillar;
a retractable gutter system housed in the A-pillar, the gutter system including a cover, a movable member connected to the cover, and a drive mechanism operably connected to the cover, the drive mechanism configured to move the cover from a stowed position to a deployed position, where in the stowed position an outer surface of the cover at least partially forms an outer surface of the outer forming part, and where in the deployed position the movable member is shaped to channel water flowing across the exterior surface of the windshield down the outer forming part of the A-pillar, wherein the outer forming part includes inner walls defining a channel sized to receive the cover in the stowed position, wherein at least one linkage pivotally connects the cover to one of the inner walls of the outer forming part, a drive linkage operably engages the drive mechanism to the at least one linkage, and movement of the at least one linkage via the drive mechanism moves the cover outwardly from the outer forming part.

11. The vehicle of claim 10, further comprising a controller configured to actuate the drive mechanism in response to input from at least one of a user and a sensor configured to detect water on the exterior surface of the associated windshield.

12. The vehicle of claim 10, wherein the channel is elongated in both a front-back direction and bottom-up direction of the vehicle.

13. The vehicle of claim 12, wherein the retractable gutter system includes a retention member configured to maintain the cover within the channel prior to actuation of the drive mechanism.

14. The vehicle of claim 10, wherein the movable member is a seal connected between the cover and the outer forming part.

15. A method of operating a retractable gutter system provided as part of an outer forming part of an A-pillar of a body of a vehicle, the method comprising:

actuating a drive mechanism of the gutter system in response to one of a user command and a sensor input indicating water on an exterior surface of a windshield;

moving a cover of the gutter system operably connected to the drive mechanism from a stowed position where the cover is positioned in an elongated channel defined by inner wall of the outer forming part and an outer surface of the cover at least partially forms an outer surface of the outer forming part to a deployed position where the cover is positioned entirely outward from the outer surface of the outer forming part to define a gap between the cover and the outer forming part;

covering the gap with a movable member of the gutter system, the movable member is a seal shaped to collect water flowing across the exterior surface of the windshield, the seal connected between a lateral edge portion of the cover and one of the inner walls of the outer forming part defining the channel.

16. The method of claim 15, including maintaining the cover within the channel with a retention member of the gutter system prior to actuation of the drive mechanism.

* * * * *